(12) United States Patent
Nakagawa

(10) Patent No.: US 7,204,080 B2
(45) Date of Patent: Apr. 17, 2007

(54) AIR-FUEL RATIO CONTROLLER FOR INTERNAL COMBUSTION ENGINE

(75) Inventor: Norihisa Nakagawa, Numadu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/359,461

(22) Filed: Feb. 23, 2006

(65) Prior Publication Data
US 2006/0242948 A1 Nov. 2, 2006

(30) Foreign Application Priority Data
Apr. 27, 2005 (JP) ............................ 2005-129985

(51) Int. Cl.
*F01N 3/00* (2006.01)
(52) U.S. Cl. ..................... 60/285; 60/274; 60/276; 701/103; 701/109
(58) Field of Classification Search .............. 60/274, 60/276, 277, 285, 286; 701/103, 109, 115
See application file for complete search history.

(56) References Cited

U.S. PATENT DOCUMENTS 5,227,975 A * 7/1993 Nakaniwa ............... 701/103
5,640,846 A * 6/1997 Ohuchi et al. ............ 60/276
6,292,739 B1 * 9/2001 Yasui et al. .............. 701/109
6,438,946 B1 * 8/2002 Majima et al. ........... 60/285
6,868,326 B2 * 3/2005 Yasui ....................... 701/101

FOREIGN PATENT DOCUMENTS

JP  A 7-197837    8/1995
JP  A 2004-183585  7/2004

* cited by examiner

*Primary Examiner*—Binh Q. Tran
(74) *Attorney, Agent, or Firm*—Oliff & Berridge, PLC

(57) ABSTRACT

A first integration value is obtained by performing time integration on a feedback control signal during the time interval between the instant at which the deviation between a reference signal and the output signal of an oxygen sensor reverses from a negative value to a positive value and the instant at which the deviation reverses back to the negative value. A second integration value is obtained by performing time integration on a feedback control signal during the time interval between the instant at which the deviation between a reference signal and the output signal of the oxygen sensor reverses from a positive value to a negative value and the instant at which the deviation reverses back to the positive value. When the deviation between the absolute values of the first and second integration values is smaller than a predetermined threshold value, it is concluded that a feedback learning value is completely learned.

4 Claims, 4 Drawing Sheets

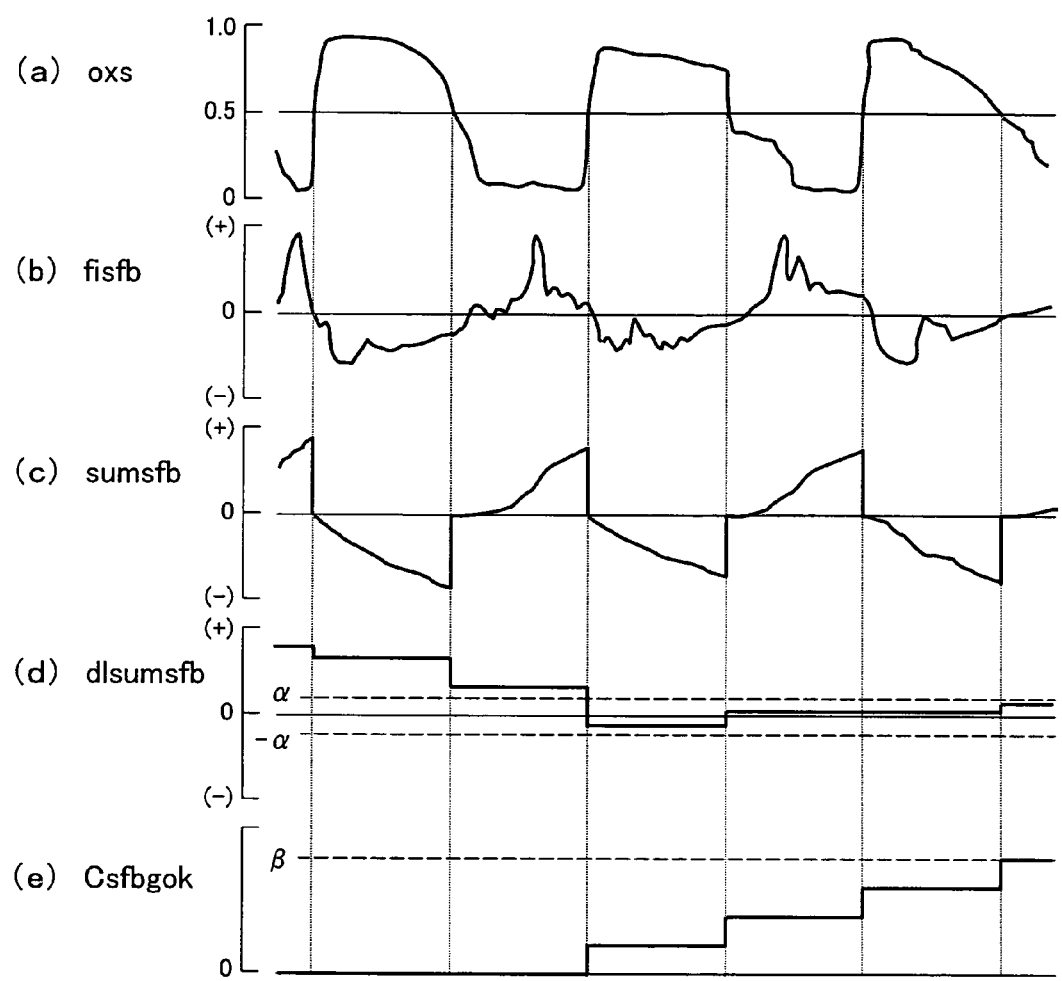

AIR-FUEL RATIO CONTROLLER FOR INTERNAL COMBUSTION ENGINE

BACKGROUND OF THE INVENTION

1. Field of the Invention

The present invention relates to an air-fuel ratio controller for an internal combustion engine, and more particularly to an internal combustion engine air-fuel ratio controller for exercising feedback control over the air-fuel ratio in accordance with the output signal of an oxygen sensor that is installed downstream of a catalyst, and learning a steady component contained in a feedback control signal.

2. Background Art

A conventional controller disclosed, for instance, by Japanese Patent Laid-Open No. Hei7-197837 and Japanese Patent Laid-Open No. 2004-183585 controls the air-fuel ratio in accordance with the output signal of an A/F sensor, which is installed in an exhaust path and positioned upstream of a catalyst (three-way catalyst), and with the output signal of an $O_2$ sensor, which is installed in the exhaust path and positioned downstream of the catalyst. The A/F sensor is an oxygen sensor that exhibits a linear output characteristic in relation to the air-fuel ratio. The $O_2$ sensor is an oxygen sensor having such an output characteristic that its output suddenly changes on the rich side and lean side with reference to the theoretical air-fuel ratio. In an air-fuel ratio controller having these two oxygen sensors (hereinafter referred to as the conventional controller), the fuel amount is feedback-controlled in accordance with the output signal of the A/F sensor so that the air-fuel ratio of an exhaust gas flowing into the catalyst coincides with a target air-fuel ratio (this control operation is hereinafter referred to as main feedback control). In addition to this main feedback control, another control operation is also performed to correct the output signal of the A/F sensor in accordance with the output signal of the $O_2$ sensor (this control operation is hereinafter referred to as sub feedback control).

In main feedback control, the conventional controller calculates a feedback control signal from the deviation between the output signal of the A/F sensor and a target signal based on the target air-fuel ratio. The target air-fuel ratio, which is used for main feedback control, is set to an air-fuel ratio (usually a theoretical air-fuel ratio) that allows the catalyst to purify the exhaust gas with the highest efficiency. However, the actual air-fuel ratio of the exhaust gas may deviate toward the rich side or lean side and away from the theoretical air-fuel ratio due to A/F sensor zero output point displacement, output characteristic changes, and other factors although main feedback control is exercised. The catalyst is capable of occluding oxygen. It maintains the catalyst atmosphere at a level close to the theoretical air-fuel ratio by occluding/discharging oxygen. However, if the exhaust air-fuel ratio continuously tends to deviate toward the rich side, the oxygen occluded by the catalyst is depleted so that HC and CO, which are contained in the exhaust gas, cannot be purified. If, on the other hand, the exhaust air-fuel ratio continuously tends to deviate toward the lean side, the oxygen occluded by the catalyst reaches saturation so that NOx cannot be purified.

Sub feedback control is exercised to complement a main feedback control operation and improve the emission characteristic of an internal combustion engine. In sub feedback control, the conventional controller calculates the correction amount for the A/F sensor output from the deviation between the output signal of the $O_2$ sensor and a reference signal based on the theoretical air-fuel ratio, and corrects the output signal of the A/F sensor accordingly. This ensures that the deviation of the exhaust air-fuel ratio from the theoretical air-fuel ratio is reflected in the feedback control signal for main feedback control. It is therefore possible to exercise accurate air-fuel ratio control by compensating for air-fuel ratio control error that is caused, for instance, by A/F sensor zero output point displacement.

In sub feedback control, however, a steady component contained in a sub feedback control signal is also learned as a feedback learning value (sub feedback learning value). When the sub feedback learning value is added to the output signal of the A/F sensor, the air-fuel ratio is corrected so as to compensate for the above error. This ensures that the actual air-fuel ratio can be rendered close to the theoretical air-fuel ratio immediately after the start of sub feedback control.

The sub feedback learning value can be continuously learned while sub feedback control is exercised. However, if, for instance, the amount of fuel injection is cut for deceleration or increased for acceleration during sub feedback control, the catalyst atmosphere considerably deviates toward the lean side or rich side and away from the vicinity of the theoretical air-fuel ratio. If learning is conducted under such conditions, the sub feedback learning value becomes unstable, thereby increasing the deviation between the reference signal and the output signal of the $O_2$ sensor.

To prevent the sub feedback learning value from becoming unstable, it is preferred that learning be completed at a certain point of time to fix the sub feedback learning value without allowing learning to be conducted continuously. To provide an excellent emission characteristic in such a case, it is demanded that learning be completed when a sub feedback learning value for making full use of the catalyst's purification capability is obtained.

SUMMARY OF THE INVENTION

The present invention has been made to solve the above problems. It is an object of the present invention to provide an internal combustion engine air-fuel ratio controller that is capable of completing a learning process when a feedback learning value for making full use of the purification capability of a catalyst is obtained in a situation where the air-fuel ratio is feedback-controlled by using the output signal of an oxygen sensor that is positioned downstream of the catalyst.

The above object is achieved by an internal combustion engine air-fuel ratio controller according to one aspect of the present invention.

The controller includes an oxygen sensor, a feedback control unit and a learning unit. The oxygen sensor is mounted in an exhaust path of an internal combustion engine and positioned downstream of a catalyst. The feedback control unit exercises feedback control over the air-fuel ratio by using an output signal of the oxygen sensor so that the output signal of the oxygen sensor coincides with a predetermined reference signal. The learning unit learns a steady component contained in a feedback control signal for the feedback control as a feedback learning value.

The controller also includes a first integration value calculation unit, a second integration value calculation unit and a learning completion judgment unit. The first integration value calculation-unit performs time integration on the feedback control signal during the time interval between the instant at which the deviation between the reference signal and the output signal of the oxygen sensor reverses from a negative value to a positive value and the instant at which the deviation reverses back to the negative value. The second integration value calculation unit performs time integration on the feedback control signal during the time interval between the instant at which the deviation between the reference signal and the output signal of the oxygen sensor reverses from a positive value to a negative value and the instant at which the deviation reverses back to the positive value. The learning completion judgment unit calculates the deviation between the absolute value of a first integration value, which is calculated by the first integration value calculation unit, and the absolute value of a second integration value, which is calculated by the second integration value calculation unit, and judging, when the calculated deviation is smaller than a predetermined threshold value, that the feedback learning value is completely learned.

Other objects and further features of the present invention will be apparent from the following detailed description when read in conjunction with the accompanying drawings.

BRIEF DESCRIPTION OF DRAWINGS

FIG. 4 is an example that illustrates how the sub feedback correction fuel amount "fisfb", its integral "sumsf", rich/lean deviation value "dlsumsfb", and count "Csfbgok" vary with changes in the output signal "oxs" of the $O_2$ sensor when sub feedback control is exercised.

DESCRIPTION OF THE PREFERRED EMBODIMENT

[Engine System Configuration]

Figure 1:
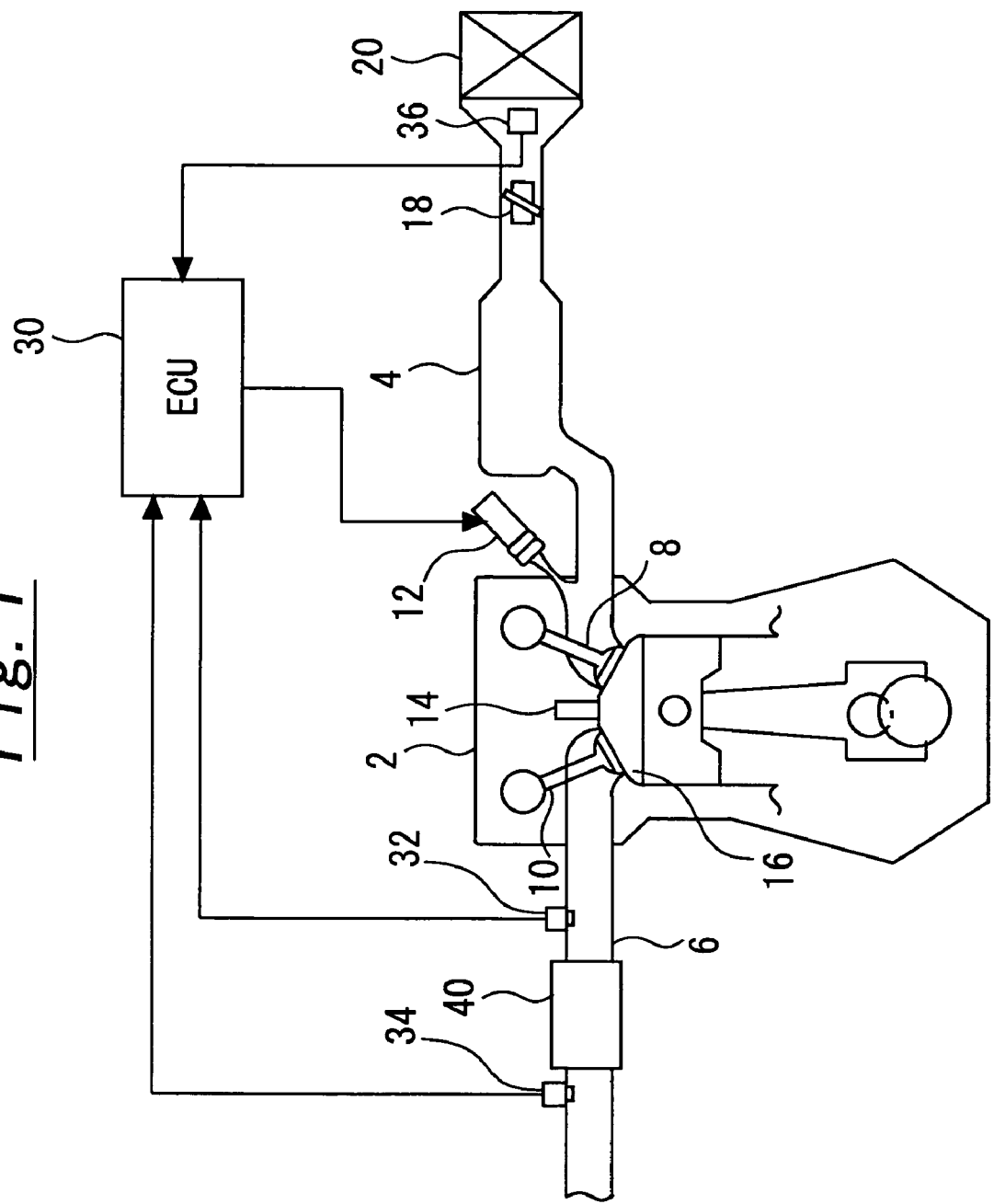
FIG. 1 is a schematic diagram illustrating the configuration of an engine system to which an internal combustion engine air-fuel ratio controller according to an embodiment of the present invention is applied.

FIG. 1 is a schematic diagram illustrating the configuration of an engine system to which an internal combustion engine air-fuel ratio controller according to an embodiment of the present invention is applied. A combustion chamber 16 of an internal combustion engine 2 according to the present embodiment is connected to an intake path 4 and an exhaust path 6. The joint between the combustion chamber 16 and intake path 4 is provided with an intake valve 8, which controls the communication between the combustion chamber 16 and intake path 4. The joint between the combustion chamber 16 and exhaust path 6 is provided with an exhaust valve 10, which controls the communication between the combustion chamber 16 and exhaust path 6. The intake path 4 is provided with an air cleaner 20. An electronically controlled throttle valve 18, which adjusts the amount of fresh air flow into the combustion chamber 16, is placed downstream of the air cleaner 20. An injector 12 for supplying fuel to the combustion chamber 16 is mounted near the intake valve 8 in the intake path 4. A three-way catalyst 40 is placed in the exhaust path 6 to purify toxic substances (HC, CO, and NOx) in an exhaust gas.

The internal combustion engine 2 includes an ECU (Electronic Control Unit) 30 as its controller. In accordance with internal combustion engine operation data, which is obtained by a plurality of sensors, the ECU 30 exercises overall control over various devices involved in the operation of the internal combustion engine 2. The signal input part of the ECU 30 is connected to an A/F sensor 32, an $O_2$ sensor 34, and an air flow meter 36. The A/F sensor 32 is installed in the exhaust path 6 and positioned upstream of the three-way catalyst 40. The A/F sensor 32 outputs a signal that linearly corresponds to the air-fuel ratio of an exhaust gas flow into the three-way catalyst 40. The $O_2$ sensor 34 is installed in the exhaust path 6 and positioned downstream of the three-way catalyst 40. The $O_2$ sensor 34 outputs a signal that indicates the air-fuel ratio status (lean or rich) of an exhaust gas flowing out of the three-way catalyst 40. The $O_2$ sensor 34 has such an output characteristic that its output suddenly changes on the rich side and lean side with reference to the theoretical air-fuel ratio. The air flow meter 36 is positioned immediately downstream of the air cleaner 20 to output a signal corresponding to the intake air flow rate. The signal output part of the ECU 30 is connected to the injector 12. In accordance with signals supplied from sensors 32, 34, and 36, the ECU 30 calculates the fuel injection amount and fuel injection timing and supplies a drive signal to the injector 12. Although a plurality of sensors and other devices are also connected to the ECU 30 in addition to sensors 32, 34, and 36 and injector 12, they are not described herein.

[Air-Fuel Ratio Control]

Figure 2:
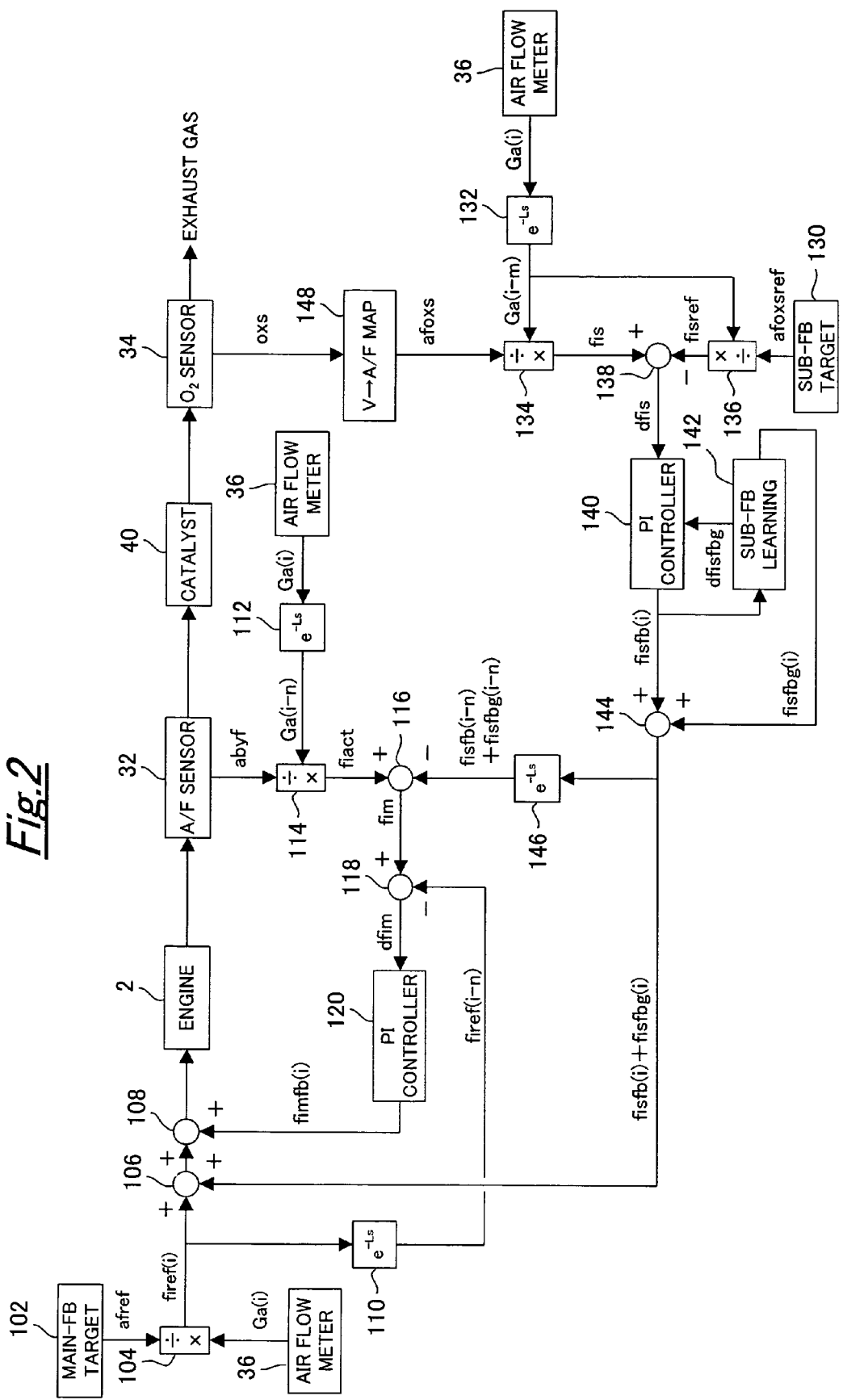
FIG. 2 is a functional block diagram illustrating a situation where the ECU functions as an air-fuel ratio controller.

As an internal combustion engine control process, the ECU 30 exercises air-fuel ratio control while the internal combustion engine 2 is running. In this control process, the amount of fuel injection from the injector 12 is controlled so that the air-fuel ratio of the exhaust gas coincides with a target air-fuel ratio. The air-fuel ratio control process is divided into main feedback control and sub feedback control. In main feedback control, the fuel amount is controlled in accordance with the output signal of the A/F sensor 32. In sub feedback control, the fuel amount is controlled in accordance with the output signal of the $O_2$ sensor 34. FIG. 2 is a functional block diagram illustrating a situation where the ECU 30 functions as an air-fuel ratio controller. Air-fuel ratio control exercised by the ECU 30 will now be described with reference to FIG. 2.

(1) Calculation of Basic Fuel Amount

The ECU 30 includes a target air-fuel ratio setting section 102 and a basic fuel amount calculation section 104. In accordance with the engine speed and throttle opening, the target air-fuel ratio setting section 102 sets a target air-fuel ratio "afref" of the air-fuel mixture to be supplied to the internal combustion engine 2. The basic fuel amount calculation section 104 calculates a basic fuel amount "firef" by dividing an intake air amount "Ga", which is derived from the output signal of the air flow meter 36, by the target air-fuel ratio "afref", which is set by the target air-fuel ratio setting section 102. The intake air amount "Ga" is acquired on each cycle and stored into a memory of the ECU 30.

(2) Calculation of Final Fuel Amount

The ECU 30 includes a sub fuel amount correction section 106 and a main fuel amount correction section 108. The sub fuel amount correction section 106 adds a sub feedback correction fuel amount "fisfb" and a sub feedback learning fuel amount "fisfbg", which are derived from sub feedback control described later, to the basic fuel amount "firef", which is calculated by the basic fuel amount calculation section 104. The main fuel amount correction section 108 adds a main feedback correction fuel amount fimfb, which is derived from main feedback control described later, to the fuel amount corrected by the sub fuel amount correction section 106. When the sub feedback correction fuel amount "fisfb", sub feedback learning fuel amount "fisfbg", and main feedback correction fuel amount "fimfb" are added to the basic fuel amount "firef" as described above, a final fuel amount "firef+fisfb+fisfbg+fimfb" is obtained. The amount of fuel injection from the injector 12 agrees with the final fuel amount.

(3) Calculation of Main Feedback Correction Fuel Amount

The main feedback correction fuel amount "fimfb" is obtained when main feedback control is exercised as described below. As main feedback control means, the ECU 30 includes a target fuel amount setting section 110, an actual fuel amount calculation section 114, an intake air amount delay section 112, a feedback target fuel amount calculation section 116, a removal fuel amount setting section 146, a fuel deviation amount calculation section 118, and a PI controller 120.

In main feedback control according to the present embodiment, a target fuel amount "firef(i−n)" is used as a feedback control target value. The target fuel amount "firef(i−n)" is the basic fuel amount "firef" that prevailed "n" cycles earlier than the present time ("i"th cycle). The basic fuel amount "firef" is calculated by the basic fuel amount calculation section 104 on each cycle and stored into the memory of the ECU 30. The target fuel amount setting section 110 accesses the memory in which various basic fuel amounts "firef" are stored, reads the basic fuel amount "firef(i−n)" that prevailed "n" cycles earlier than the present time, and sets the read basic fuel amount as the target fuel amount. The value "n" corresponds to the interval (number of cycles) between the instant at which fuel is injected from the injector 12 and the instant at which an exhaust gas containing the injected fuel reaches the A/F sensor 32.

In main feedback control, the output signal of the A/F sensor 32 is used. The output signal of the A/F sensor 32 is converted to an air-fuel ratio "abyf" in accordance with a voltage/air-fuel ratio map. The actual fuel amount calculation section 114 converts the air-fuel ratio "abyf" to the fuel amount (actual fuel amount) "fiact" by dividing the intake air amount "Ga(i−n)" by the air-fuel ratio "abyf". The intake air amount delay section 112 reads the intake air amount "Ga(i−n)" from the memory of the ECU 30. The intake air amount delay section 112 accesses the memory in which various intake air amounts "Ga" are stored, and reads the intake air amount "Ga(i−n)" that prevailed "n" cycles earlier than the present time ("i"th cycle).

The feedback target fuel amount calculation section 116 calculates the fuel amount targeted for main feedback control (feedback target fuel amount) "fim" by subtracting a removal target fuel amount from the actual fuel amount "fiact", which is calculated by the actual fuel amount calculation section 114. The removal target fuel amount is represented by the sub feedback correction fuel amount "fisfb(i−n)" and sub feedback learning fuel amount "fisfbg(i−n)" that prevailed "n" cycles earlier than the present time ("i"th cycle). The sub feedback correction fuel amount "fisfb" and sub feedback learning fuel amount "fisfbg" are calculated on each cycle and stored into the memory of the ECU 30 during sub feedback control, which is described later. The removal fuel amount setting section 142 accesses the memory in which the sub feedback correction fuel amounts "fisfb" and sub feedback learning fuel amounts "fisfbg" are stored, reads the sub feedback correction fuel amount "fisfb(i−n)" and sub feedback learning fuel amount "fisfbg(i−n)" that prevailed "n" cycles earlier than the present time, and sets the read amounts as the removal target fuel amount. When a feedback target fuel amount "fim" is obtained by subtracting the sub feedback correction fuel amount "fisfb(i−n)" and sub feedback learning fuel amount "fisfbg(i−n)" from the actual fuel amount "fiact" as described above, it is possible to prevent the fuel amount correction effect produced by sub feedback control from being negated by main feedback control.

The fuel deviation amount calculation section 118 calculates a fuel deviation amount "dfim (dfim=fim−firef(i−n))", which represents the deviation between the feedback target fuel amount "fim", which is calculated by the feedback target fuel amount calculation section 116, and the target fuel amount "firef(i−n)", which is set by the target fuel amount setting section 110.

As indicated in Equation (1), the PI controller 120 uses the fuel deviation amount "dfim", which is calculated by the fuel deviation amount calculation section 118, as an input signal (main feedback input signal), and exercises PI control over the main feedback input signal to calculate the main feedback correction fuel amount "fimfb". In Equation (1), the value "dfisum" is a time integration value of the fuel deviation amount "dfim". The value "Gainp" is the proportional gain of a P action (proportional action). The value "Gaini" is the integral gain of an I action (integral action). The calculated main feedback correction fuel amount "fimfb" is output to the main fuel amount correction section 108.

$$fimfb = Gainp \times dfim + Gaini \times dfisum \qquad \text{Equation (1)}$$

(4) Calculation of Sub Feedback Correction Fuel Amount

The sub feedback correction fuel amount "fisfb" is obtained when sub feedback control is exercised as described below. As sub feedback control means, the ECU 30 includes a voltage/air-fuel ratio conversion map 148, a fuel amount conversion section 134, an intake air amount delay section 132, a reference air-fuel ratio setting section 130, a reference fuel amount setting section 136, a fuel deviation amount calculation section 138, and a PI controller 140.

The output signal of the $O_2$ sensor 34 varies with the exhaust gas air-fuel ratio prevailing downstream of the catalyst 40. The output signal (reference signal) of the $O_2$ sensor 34 that corresponds to the theoretical air-fuel ratio is 0.5 V. When the air-fuel ratio is richer than the theoretical air-fuel ratio, the output signal of the $O_2$ sensor 34 is greater than 0.5 V. When, on the other hand, the air-fuel ratio is leaner than the theoretical air-fuel ratio, the output signal of the $O_2$ sensor 34 is smaller than 0.5 V. The voltage/air-fuel ratio conversion map 148 is used to convert the output signal (voltage value) of the $O_2$ sensor 34 to an exhaust gas air-fuel ratio. The output signal "oxs" of the $O_2$ sensor 34 is converted to an air-fuel ratio "afoxs" in accordance with the voltage/air-fuel ratio conversion map 148 and output to the fuel amount conversion section 134.

The fuel amount conversion section 134 converts the air-fuel ratio "afoxs" to a fuel amount "fis" by dividing an intake air amount "Ga(i−m)" by the air-fuel ratio "afoxs". The intake air amount delay section 132 reads the intake air amount "Ga(i−m)" from the memory of the ECU 30. The intake air amount delay section 132 accesses the memory in which various intake air amounts "Ga" are stored, and reads the intake air amount "Ga(i−m)" that prevailed "m" cycles earlier than the present time ("i"th cycle). The value "m" corresponds to the interval (number of cycles) between the instant at which fuel is injected from the injector 12 and the instant at which an exhaust gas containing the injected fuel reaches the $O_2$ sensor 34.

The reference fuel amount setting section 136 sets a reference fuel amount "fisref" as the target value for sub feedback control. The reference fuel amount "fisref" is calculated by dividing a reference air-fuel ratio "afoxsref", which is set by the reference air-fuel ratio setting section 130, by the intake air amount "Ga(i−m)". The reference air-fuel ratio setting section 130 sets the theoretical air-fuel ratio corresponding to the reference signal of the $O_2$ sensor 34 as the reference air-fuel ratio "afoxsref".

The fuel deviation amount calculation section 138 calculates a fuel deviation amount "dfis (dfis=fis−fisref)", which represents the deviation between the fuel amount "fis", which is calculated from the air-fuel ratio "afoxs" by the fuel amount conversion section 134, and the reference fuel amount "fisref", which is set by the reference fuel amount setting section 136. The fuel deviation amount "dfis" is based on the deviation between the output signal "oxs" of the $O_2$ sensor 34 and the reference signal (0.5 V). This fuel deviation amount "dfis" serves as a sub feedback input signal for sub feedback control.

As indicated in Equation (2), the PI controller 140 uses the fuel deviation amount "dfis", which is obtained by The fuel deviation amount calculation section 138, as a sub feedback input signal, and exercises PI control over the sub feedback input signal to calculate the sub feedback correction fuel amount "fisfb". In Equation (2), the value "Sdfis" is a time integration value of the fuel deviation amount "dfis". The value "$Gp_{sfb}$" is the proportional gain of a P action (proportional action). The value "$Gi_{sfb}$" is the integral gain of an I action (integral action).

$$fisfb = Gp_{sfb} \times dfis + Gi_{sfb} \times Sdfis \qquad \text{Equation (2)}$$

(5) Calculation of Sub Feedback Learning Fuel Amount

The sub feedback learning fuel amount (feedback learning value) "fisfbg" is learned from the sub feedback correction fuel amount (feedback control signal) "fisfb", which is calculated by the PI controller 140. The ECU 30 includes a sub feedback learning section 142 as learning means. The sub feedback learning section 142 learns the sub feedback learning fuel amount "fisfbg" as described below.

First of all, the sub feedback learning section 142 calculates the data for updating the sub feedback learning fuel amount "fisfbg". Learning update data "fisfbsm" is a numerical value that is obtained by performing a damping process on the sub feedback correction fuel amount "fisfb", which is calculated by Equation (2). For example, a low-pass filter can be used for the damping process. The sub feedback learning section 142 calculates a base value "dfisfbgb" for a learning update amount by processing the learning update data "fisfbsm" as indicated in Equation (3) below:

$$dfisfbgb = fisfbsm/M \qquad \text{Equation (3)}$$

Equation (3) indicates that 1/M of the learning update data "fisfbsm" is reflected in the update of the sub feedback learning fuel amount "fisfbg". A learning update reflection amount "M" is a numerical value greater than 1.

In the sub feedback learning section 142, the sub feedback learning fuel amount "fisfbg" is not incessantly learned while sub feedback control is exercised. Such a learning process terminates when a desired sub feedback learning fuel amount "fisfbg" is obtained, that is, when sub feedback learning is completed. Before completion of sub feedback learning, the base value "dfisfbgb" for a learning update amount, which is calculated by Equation (3), is set as is as the learning update amount "dfisfbg". After completion of sub feedback learning, on the other hand, the learning update amount "dfisfbg" is set to 0 (zero).

In the present embodiment, the sub feedback learning fuel amount "fisfbg" is expressed as an integral for the learning update amount "dfisfbg". As indicated in Equation (4) below, the sub feedback learning section 142 updates the sub feedback learning fuel amount "fisfbg" by adding the learning update amount "dfisfbg" to the previous value of the sub feedback learning fuel amount "fisfbg(i−1)".

$$fisfbg(i) = fisfbg(i-1) + dfisfbg \qquad \text{Equation (4)}$$

After the sub feedback learning fuel amount "fisfbg" is updated, the sub feedback learning section 142 corrects the sub feedback correction fuel amount "fisfb", which is calculated by the PI controller 140, in order to avoid a double correction based on the sub feedback learning fuel amount "fisfbg". The value "fisfb" on the left-hand side of Equation (5) is a corrected sub feedback correction fuel amount. The value "fisfb" on the right-hand side of Equation (5) is an uncorrected sub feedback correction fuel amount (the sub feedback correction fuel amount calculated by Equation (2)).

$$fisfb = fisfb - dfisfbg \qquad \text{Equation (5)}$$

As far as the above process is performed, the steady component contained in the sub feedback correction fuel amount "fisfb" moves from the sub feedback correction fuel amount "fisfb" to the sub feedback learning fuel amount "fisfbg" before completion of sub feedback learning.

A fuel totalization section 144 adds the sub feedback learning fuel amount "fisfbg", which is updated by the sub feedback learning section 142, to the sub feedback correction fuel amount "fisfb", which is corrected by Equation (5). The resulting total fuel amount "fisfb+fisfbg" serves as a sub feedback control signal for sub feedback control. The fuel totalization section 144 outputs the total fuel amount "fisfb+fisfbg" to the sub fuel amount correction section 106.

(6) Sub Feedback Learning Completion Judgment

Figure 3:
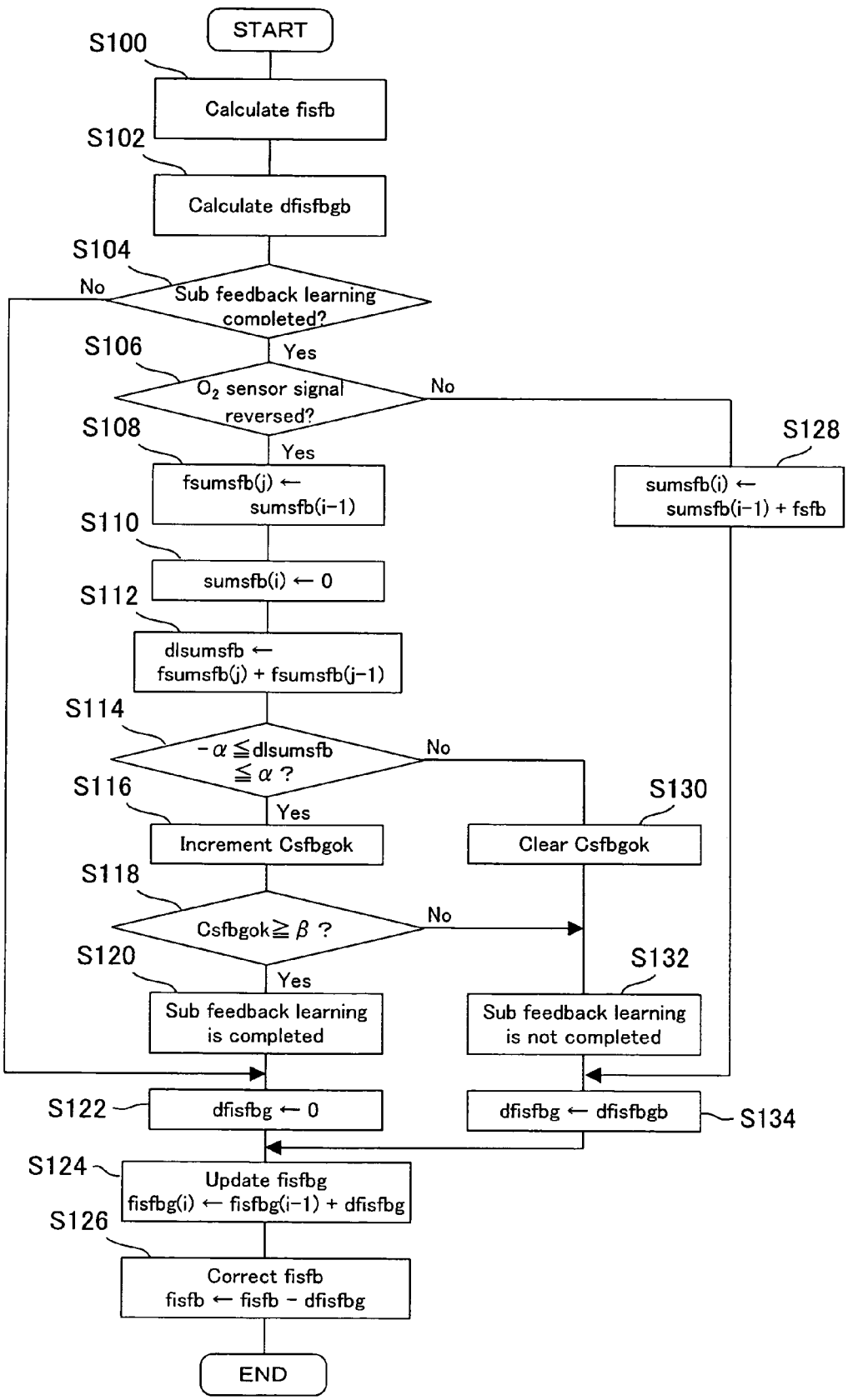
FIG. 3 is a flowchart illustrating a routine for sub feedback learning completion judgment.

The ECU 30 formulates a sub feedback learning completion judgment in accordance with a routine shown in FIG. 3. FIG. 3 is a flowchart illustrating the routine that the ECU 30 according to the present embodiment executes to judge whether sub feedback learning is completed.

In step S100, which is the first step of the routine shown in FIG. 3, the sub feedback correction fuel amount "fisfb" is calculated in accordance with the output signal "oxs" of the $O_2$ sensor 34. In the next step (step S102), the base value "dfisfbgb" for the learning update amount is calculated from the sub feedback correction fuel amount "fisfb", which is calculated in step S100.

Step S104 is performed to judge whether sub feedback learning is completed. If sub feedback learning is completed, a sub feedback learning completion flag is ON. If sub feedback learning is not completed, the flag is OFF. In an initial state of the routine, the sub feedback learning completion flag is OFF.

If the judgment result obtained in step S104 indicates that sub feedback learning is not completed, the flow proceeds to step S106. Step S106 is performed to judge whether the output signal "oxs" of the $O_2$ sensor 34 has reversed from the lean side (a value smaller than 0.5 V) to the rich side (a value greater than 0.5 V) or from the rich side to the lean side.

When sub feedback control is exercised as described above, the output signal "oxs" of the $O_2$ sensor 34 periodically changes.

If the judgment result obtained in step S106 indicates that the output signal "oxs" of the $O_2$ sensor 34 has not reversed, the flow proceeds to step S128. In step S128, the integral "sumsfb" of the sub feedback correction fuel amount "fisfb" is updated. More specifically, the value obtained by adding the sub feedback correction fuel amount "fisfb" calculated in step S100 to the integral "sumsfb(i−1)" obtained on the preceding cycle is used as the integral "sumsfb(i)" for the current cycle. After completion of step S128, the flow proceeds to step S134. In step S134, the learning update amount "dfisfbg" is set as described later.

On the other hand, if the judgment result obtained in step S106 indicates that the output signal "oxs" of the $O_2$ sensor 34 has reversed, the flow proceeds to step S108. In step S108, the integral "sumsfb(i−1)" prevailing on the preceding cycle, that is, immediately before the reversal of the output signal "oxs" of the $O_2$ sensor 34, is read and stored as a reversal integral "fsumsfb(j)" for the current reversal. The symbol "j" denotes the number of times of the output signal "oxs" of the $O_2$ sensor 34 has reversed. As described earlier, the integral "sumsfb(i)" is updated on each cycle in step S128, and reset to 0 (zero) in step S110, which is performed subsequently to step S108.

In the next step (step S112), a rich/lean deviation value "dlsumsfb" is calculated by adding the reversal integral "fsumsfb(j)" for the current reversal to the reversal integral "fsumsfb(j−1)" for the preceding reversal. The reversal integral (first integration value) "fsumsfb" prevailing when the output signal "oxs" of the $O_2$ sensor 34 is reversed from lean to rich corresponds to the amount of oxygen occluded by the catalyst 40. On the other hand, the reversal integral (second integration value) "fsumsfb" prevailing when the output signal "oxs" of the $O_2$ sensor 34 is reversed from rich to lean corresponds to the amount of oxygen discharged from the catalyst 40. Either the reversal integral "fsumsfb(j)" for the current reversal or the reversal integral "fsumsfb(j−1)" for the preceding reversal corresponds to the amount of oxygen occluded by the catalyst 40. The remaining reversal integral corresponds to the amount of oxygen discharged from the catalyst 40. Therefore, the rich/lean deviation value "dlsumsfb" denotes the difference between the current oxygen occlusion capability and oxygen discharge capability of the catalyst 40.

The purification capability of the catalyst 40 is maximized when the oxygen occlusion capability and oxygen discharge capability are balanced with each other. Therefore, if sub feedback learning is completed when there is no difference between the oxygen occlusion and oxygen discharge capabilities of the catalyst 40, that is, when the rich/lean deviation value "dlsumsfb" is close to 0 (zero), it is possible to learn the sub feedback learning fuel amount "fisfbg" that makes it possible to make full use of the purification capability of the catalyst 40. Therefore, step S114 is performed to judge whether the rich/lean deviation value "dlsumsfb" is close to 0 (zero) or, more specifically, within the range of 0±α. The value "α" is a threshold value that represents a permissible deviation.

If the judgment result obtained in step S114 indicates that the rich/lean deviation value "dlsumsfb" is within the permissible range, step S116 is performed to increment a consecutive criterion fulfillment count "Csfbgok". The count "Csfbgok" denotes the consecutive number of times the criterion has been fulfilled in step S114. This count is cleared (step S130) each time the criterion is dissatisfied in step S114.

When the rich/lean deviation value "dlsumsfb" is within the permissible range so that the count "Csfbgok" is incremented, the next step (step S118) is performed to judge whether the count "Csfbgok" has reached a predetermined learning completion judgment value "β". When the "Csfbgok" is not smaller than the learning completion judgment value "β", it is concluded that sub feedback learning is completed (step S120). If, on the other hand, the count "Csfbgok" has not reached the learning completion judgment value "β", it is concluded that sub feedback learning is not completed (step S132). Similarly, when the count "Csfbgok" is cleared in step S130, it is concluded that sub feedback learning is not completed.

FIG. 4 is an example that illustrates how the sub feedback correction fuel amount "fisfb", its integral "sumsf", rich/lean deviation value "dlsumsfb", and count "Csfbgok" vary with changes in the output signal "oxs" of the $O_2$ sensor 34 when sub feedback control is exercised. This figure indicates that the rich/lean deviation value "dlsumsfb" converges to the range of 0±α when sub feedback learning progresses in accordance with sub feedback control execution. When the consecutive criterion fulfillment count "Csfbgok" reaches the learning completion judgment value "β", it is concluded that sub feedback learning is completed. As described above, sub feedback learning is considered to be complete when the criterion in step S114 is fulfilled a consecutive number of times. It is so done to avoid a situation where it is erroneously concluded that sub feedback learning is complete when the criterion is haphazardly fulfilled while the sub feedback learning fuel amount "fisfbg" is unstable. When the above conditions are established, the sub feedback learning fuel amount "fisfbg" can be accurately learned to make full use of the purification capability of the catalyst 40.

When the completion of sub feedback learning is judged as described above, the setting for the learning update amount "dfisfbg" can be changed in accordance with the obtained judgment result. If sub feedback learning is not completed, the base value "dfisfbgb" for the learning update amount, which is calculated in step S102, is set as is as the learning update amount "dfisfbg" (step S134). If, on the other hand, sub feedback learning is completed, the learning update amount "dfisfbg" is set to 0 (zero) (step S122). When sub feedback learning is completed, the sub feedback learning completion flag turns ON. Subsequently, the criterion in step S104 is always fulfilled so that the flow skips from step S104 to step S122. This ensures that the sub feedback learning fuel amount "fisfbg" is no longer updated. As a result, the sub feedback learning fuel amount "fisfbg" is maintained at a value obtained when sub feedback learning has been completed.

In step S124, the sub feedback learning fuel amount "fisfbg" is updated. More specifically, the value obtained by adding the learning update amount "dfisfbg" set in step S122 or S134 to the sub feedback learning fuel amount "fisfbg(i−1)" prevailing on the preceding cycle is used as the sub feedback learning fuel amount "fisfbg(i)" for the current cycle. In the next step (step S126), the learning update amount "dfisfbg" is subtracted from the sub feedback correction fuel amount "fisfb", which is calculated in step S100, to avoid a double correction based on the learning update amount "dfisfbg".

In the present embodiment, the "first integration value calculation unit," "second integration value calculation unit," and "learning completion judgment unit" according to the present invention is implemented when the ECU 30 executes the routine described above.

[Advantages of the Air-Fuel Ratio Controller According to the Present Embodiment]

As described above, the air-fuel ratio controller according to the present embodiment concludes that sub feedback learning is completed when the rich/lean deviation value "dlsumsfb", which denotes the deviation between the oxygen occlusion and oxygen discharge capabilities of the catalyst 40, is decreased to the permissible range. Thus, the air-fuel ratio controller according to the present embodiment can learn the sub feedback learning fuel amount "fisfbg" for making full use of the purification capability of the catalyst 40. After completion of sub feedback learning, the sub feedback learning fuel amount "fisfbg" is no longer updated. It is therefore possible to prevent the sub feedback learning fuel amount "fisfbg" from becoming unstable due to a cut or increase in the amount of fuel injection.

[Others]

While the present invention has been described in terms of a preferred embodiment, it should be understood that the present invention is not limited to the preferred embodiment, and that variations may be made without departure from the scope and spirit of the invention. In sub feedback control according to the preferred embodiment described above, the output signal of the $O_2$ sensor 34 is used to correct the fuel amount directly. Alternatively, the output signal of the A/F sensor, which is used for main feedback control, may be corrected to correct the fuel amount indirectly.

Further, the preferred embodiment described above sets the learning update amount "dfisfbg" to 0 (zero) upon completion of sub feedback learning so that the sub feedback learning fuel amount "fisfbg" is not longer updated. Alternatively, 1/N (N>1) the base value "dfisfbgb" may set as the learning update amount "dfisfbg (dfisfbg=dfisfbgb/N)" to decrease the update amount for the sub feedback learning fuel amount "fisfbg". This alternative also reduces the influence of a cut or increase in the amount of fuel injection, and prevents the sub feedback learning fuel amount "fisfbg" from becoming unstable.

The major benefits of the present invention described above are summarized follows:

According to a first aspect of the present invention, the absolute value of the first integration value of the feedback control signal, which is obtained during the time interval between the instant at which the deviation between the reference signal and the output signal of the oxygen sensor changes from a negative value to a positive value and the instant at which the deviation changes back to the negative value, corresponds to the amount of oxygen occluded by the catalyst. Meanwhile, the absolute value of the second integration value of the feedback control signal, which is obtained during the time interval between the instant at which the deviation between the reference signal and the output signal of the oxygen sensor changes from a positive value to a negative value and the instant at which the deviation changes back to the positive value, corresponds to the amount of oxygen discharged from the catalyst. The catalyst's purification capability can be fully used when the amount of oxygen occluded by the catalyst matches the amount of oxygen discharged from the catalyst. Therefore, if learning is judged to be completed when the deviation between the absolute value of the first integration value and the absolute value of the second integration value is smaller than the threshold value, a feedback learning value for making full use of the catalyst's purification capability can be learned.

According to a second aspect of the present invention, it is possible to avoid erroneously judging that learning is completed when the deviation is haphazardly smaller than the threshold value while the feedback learning value is unstable.

According to a third aspect of the present invention, the feedback learning value is kept from being further updated when the deviation between the absolute value of the first integration value and the absolute value of the second integration value is smaller than the threshold value. Consequently, it is possible to prevent the feedback learning value from becoming unstable due to a cut or increase in the amount of fuel injection.

According to a fourth aspect of the present invention, the subsequent update amount for the feedback learning value decreases when the deviation between the absolute value of the first integration value and the absolute value of the second integration value is smaller than the threshold value. Consequently, it is possible to reduce the influence of a cut or increase in the amount of fuel injection, and prevent the feedback learning value from becoming unstable.

The invention claimed is:

1. An internal combustion engine air-fuel ratio controller, comprising:
    an oxygen sensor that is mounted in an exhaust path of an internal combustion engine and positioned downstream of a catalyst;
    a feedback control unit for exercising feedback control over the air-fuel ratio by using an output signal of the oxygen sensor so that the output signal of the oxygen sensor coincides with a predetermined reference signal;
    a learning unit for learning a steady component contained in a feedback control signal for the feedback control as a feedback learning value;
    a first integration value calculation unit for performing time integration on the feedback control signal during the time interval between the instant at which the deviation between the reference signal and the output signal of the oxygen sensor reverses from a negative value to a positive value and the instant at which the deviation reverses back to the negative value;
    a second integration value calculation unit for performing time integration on the feedback control signal during the time interval between the instant at which the deviation between the reference signal and the output signal of the oxygen sensor reverses from a positive value to a negative value and the instant at which the deviation reverses back to the positive value; and
    a learning completion judgment unit for calculating the deviation between the absolute value of a first integration value, which is calculated by the first integration value calculation unit, and the absolute value of a second integration value, which is calculated by the second integration value calculation unit, and judging, when the calculated deviation is smaller than a predetermined threshold value, that the feedback learning value is completely learned.

2. The internal combustion engine air-fuel ratio controller according to claim 1, wherein, when the deviation remains smaller than the threshold value for a predetermined period of time, the learning completion judgment unit judges that the feedback learning value is completely learned.

3. The internal combustion engine air-fuel ratio controller according to claim 1, wherein, when the learning completion judgment unit judges that learning is completed, the learning unit keeps the feedback learning value from being further updated.

4. The internal combustion engine air-fuel ratio controller according to claim 1, wherein, when the learning completion judgment unit judges that learning is completed, the learning unit decreases the subsequent update amount for the feedback learning value.

* * * * *